US006828703B2

(12) United States Patent
Einheuser et al.

(10) Patent No.: US 6,828,703 B2
(45) Date of Patent: Dec. 7, 2004

(54) DIODE INTERCONNECTION IN AN ALTERNATOR RECTIFIER

(75) Inventors: Gary M. Einheuser, Milford, MI (US); Jeanne M. Schiavone, Howell, MI (US); Michael E. Harris, Saline, MI (US); Paul M. Evans, Ypsilanti, MI (US); Carl W. Cenzer, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/382,667

(22) Filed: Mar. 6, 2003

(65) Prior Publication Data

US 2004/0174081 A1 Sep. 9, 2004

(51) Int. Cl.[7] ............................................... H02K 11/00
(52) U.S. Cl. .................. 310/68 D; 310/68 R; 363/141; 363/145
(58) Field of Search ................................ 310/68 D, 71, 310/68 R, 66; 363/141, 145, 142, 146; 361/709, 386, 387, 388

(56) References Cited

U.S. PATENT DOCUMENTS

| 3,739,209 | A | * | 6/1973 | Drabik .......................... 310/64 |
|---|---|---|---|---|
| 3,979,659 | A | | 9/1976 | Lynch, Jr. et al. ........... 363/145 |
| 4,103,193 | A | | 7/1978 | Ito ............................. 310/68 D |
| 4,160,179 | A | | 7/1979 | Allport et al. ............. 310/68 R |
| 4,169,282 | A | | 9/1979 | Allport et al. ............. 310/68 R |
| 4,482,827 | A | | 11/1984 | Baldwin ...................... 363/145 |
| 4,546,280 | A | | 10/1985 | Pflüger ...................... 310/68 D |
| 5,043,614 | A | * | 8/1991 | Yockey ...................... 310/68 D |
| 5,233,246 | A | * | 8/1993 | Yockey ......................... 310/71 |
| 5,640,062 | A | | 6/1997 | Yockey ...................... 310/68 D |
| 5,682,070 | A | | 10/1997 | Adachi et al. ................. 310/71 |
| 5,712,517 | A | | 1/1998 | Schmidt et al. ............... 310/45 |
| 5,729,063 | A | | 3/1998 | Adachi et al. ............ 310/68 D |
| 5,883,450 | A | | 3/1999 | Abadia et al. ............. 310/68 D |
| 5,955,805 | A | | 9/1999 | Chaudoreille et al. ........ 310/90 |
| 5,982,062 | A | | 11/1999 | Gautier ...................... 310/68 D |
| 6,081,054 | A | | 6/2000 | Kashihara et al. ........ 310/68 D |
| 6,100,613 | A | | 8/2000 | Tanaka et al. ............ 310/68 D |
| 6,121,699 | A | | 9/2000 | Kashihara et al. ........ 310/68 D |
| 6,184,600 | B1 | | 2/2001 | Asao et al. ............... 310/68 D |
| 6,184,602 | B1 | | 2/2001 | Ooiwa et al. ............. 310/68 D |
| 6,198,187 | B1 | | 3/2001 | Asao et al. ............... 310/68 D |
| 6,278,208 | B1 | | 8/2001 | Linden et al. ................. 310/90 |
| 6,285,100 | B1 | | 9/2001 | Pflueger et al. ........... 310/68 D |
| 6,528,911 | B1 | * | 3/2003 | De Petris ..................... 310/64 |
| 6,661,135 | B2 | * | 12/2003 | Borden et al. ............ 310/68 D |
| 2002/0043882 | A1 | | 4/2002 | Tanaka et al. ................. 310/71 |
| 2002/0043885 | A1 | | 4/2002 | Asao et al. ..................... 310/90 |
| 2002/0047357 | A1 | | 4/2002 | Gautier ...................... 310/68 D |
| 2002/0114177 | A1 | | 8/2002 | DeNardis ..................... 363/141 |

* cited by examiner

*Primary Examiner*—Dang Le
*Assistant Examiner*—Leda Pham
(74) *Attorney, Agent, or Firm*—Brinks Hofer, Gilson & Lione

(57) ABSTRACT

An alternator having a plurality of positive and negative diodes, is disclosed. The alternator further includes a plurality of stator windings each of the plurality of stator windings has a first end and a second end, and a first diode plate for fixing one of the plurality of positive and plurality of negative diodes in a first orientation. Further, the alternator includes a second diode plate for fixing the other of the plurality of negative and plurality of positive diodes in a second orientation. Each of the anodes of the positive diodes are connected to each of the cathodes of the negative diodes and to at least one end of each of the plurality of stator windings to form a rectifier bridge circuit.

16 Claims, 3 Drawing Sheets

US 6,828,703 B2

DIODE INTERCONNECTION IN AN ALTERNATOR RECTIFIER

TECHNICAL FIELD

The present invention relates generally to alternator rectifiers and the electrical connection of the alternators rectifier bridge circuit.

BACKGROUND

An alternator is put to use in many applications, including generating alternating current in an automobile. Conventional alternators include a rotor, a stator, a rectifier bridge, housing, and a cooling fan. The rotor is typically a claw pole configuration that contains a field coil. The start and end leads of the coil are attached to slip rings that are insulated from the rotor shaft. Insulated stationary carbon brushes communicate the generated field current to the slip rings. The brushes and slip rings provide a means of maintaining electrical continuity between the stationary DC electrical supply and the rotating rotor. Direct current from the batteries is applied to the rotating field through the field terminal and insulated brushes.

The rotor is disposed within the stator. An air gap is maintained between the rotor and stator. The rotors magnetic field energizes the coils or windings of the stator at the same time to maximize the magnetic force. Since the battery and electrical system of a vehicle cannot accept or store an AC voltage, a rectifier bridge is provided to convert AC current to DC current. A rectifier bridge includes both positive and negative diodes. The diodes act as a one-way check valve switching current back and forth so that the current flows only in one direction. More specifically, when AC current reverses itself, the diode blocks the current and no current flows. Typically, AC generators or alternators use a pair of diodes for each stator winding. For example, in a three-phase alternator, three of the diodes are positive biased and another three diodes are negative biased. The use of diodes that are reversed biased with respect to each other allows for rectification of both sides of the AC sign wave.

In order to electrically interconnect the positive and negative diodes, generally a circuit board is employed. The anode of the positive diodes, the cathode of the negative diodes, and the stator windings lead are electrically interconnected to the circuit board. This arrangement requires multiple electrical interconnects reducing reliability of the overall alternator assembly, increasing manufacturing complexity and cost.

Therefore there is a need for a new and improved alternator assembly for electrically interconnecting the positive, negative, and stator windings start and end leads to form a rectifier bridge. The new and improved assembly should reduce the number of electrical interconnects, reduce manufacturing complexity, and cost.

SUMMARY

In an aspect of the present invention, an alternator includes a plurality of positive diodes and negative diodes having an anode electrode and a cathode electrode. The alternator further includes a plurality of stator windings that have a first end and a second end. Further, a first diode plate is provided that fixes one of the plurality of positive diodes in a first orientation. Further, the alternator includes a second diode plate for fixing the negative diodes in a second orientation. Each of the anodes of the positive diodes are connected to each of the cathodes of the negative diodes and to at least one end of each of the plurality of stator windings to form a rectifier bridge circuit.

In another aspect of the present invention, a plurality of stator windings include three stator windings.

In yet another aspect of the present invention, the first diode plate is planar and the first orientation is axially oriented.

In yet another aspect of the present invention, the second diode plate is cylindrical and the second orientation is radially oriented.

In still another aspect of the present invention, the first diode plate fixes the plurality of positive diodes in the first orientation.

In still another aspect of the present invention, the second diode plate fixes the plurality of negative diodes in the second orientation.

In still another aspect of the present invention, the first diode plate fixes the plurality of negative diodes in the first orientation.

In still another aspect of the present invention, the second diode plate fixes the plurality of positive diodes in the second orientation.

These and other aspects and advantages of the present invention will become apparent upon reading the following detailed description of the invention in combination with the accompanying drawings.

DETAILED DESCRIPTION

Figure 1:
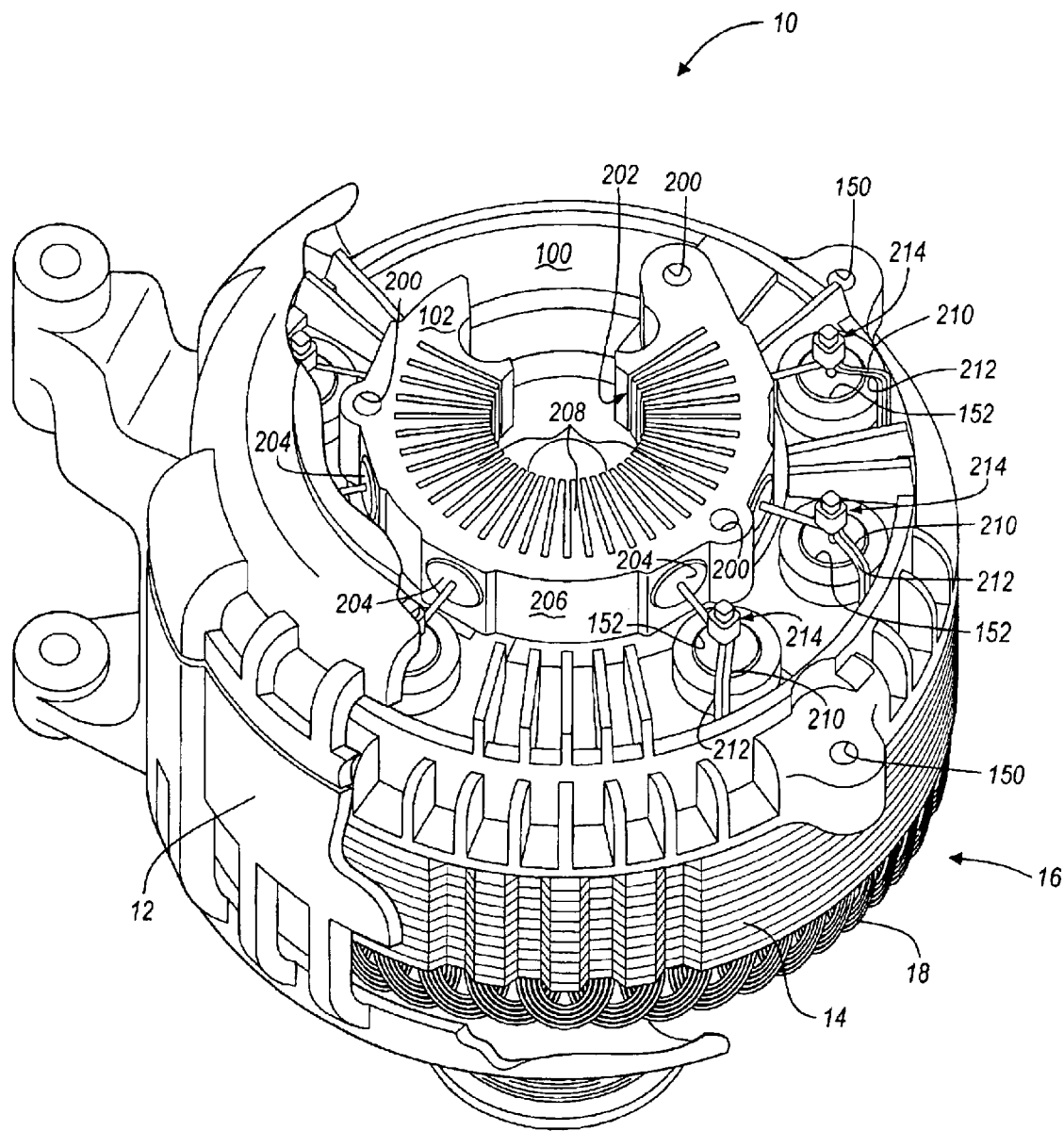
FIG. 1 illustrates a partial alternator assembly, in accordance with the present invention.

Referring now to FIG. 1, a partial cutaway view of alternator assembly 10 is illustrated, in accordance with the present invention. The alternator assembly 10 includes a housing 12 typically made of cast aluminum. Housing 12 encases a lamination stack 14. A plurality of stator windings 18 are wound about lamination stack 14 to form the stator assembly 16. A rotor (not shown) mounted to a shaft (not shown) is typically disposed within stator assembly 16 and adapted to rotate freely therein.

Figure 2:
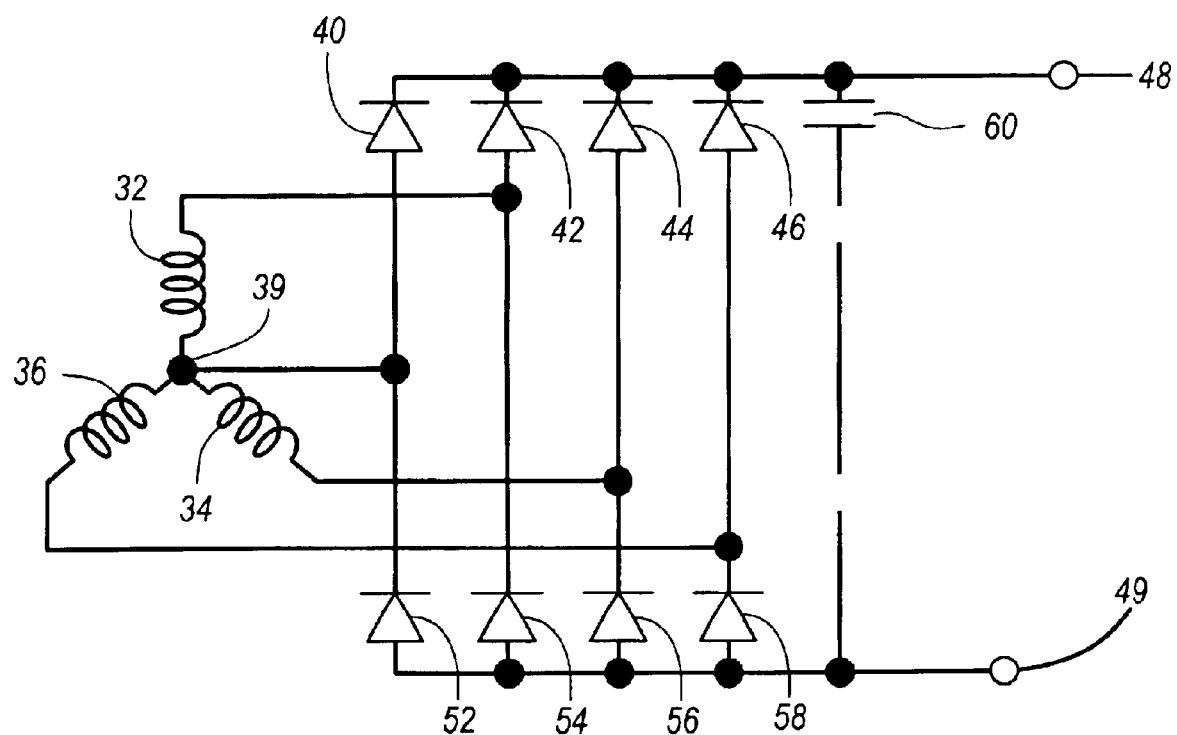
FIG. 2 is an electrical schematic diagram of a rectifier bridge uncut, in accordance with the present invention.

As conventionally known, as the rotor rotates within stator assembly 16, an alternating current is produced in the stator windings 18. Some applications, such as the automotive application require DC power, thus the current must be converted from AC to DC. In order to convert from AC to DC current, the current must be rectified by passing through a series of positive and negative diodes, otherwise known as a rectifier bridge. A typical rectifier bridge is shown in FIG. 2, in accordance with the present invention. If for example, the alternator of the present invention is a three-phase alternator having three separate stator coils or windings as illustrated by inductors 32, 34 and 36. Coils 32, 34, 36 would be connected to a plurality of positive and negative diodes that are connected in parallel to a vehicle battery/loads. For example, the plurality of positive diodes 40, 42, 44 and 46 have the cathodes connected to a positive end 48 of the vehicle battery/loads and their anodes connected to a series of negative diodes 52, 54, 56 and 58. The anodes of diodes 52, 54, 56 and 58 are connected to the negative end of the battery/loads. The coils or windings 32, 34 and 36 are connected at one end 39 to the first positive and negative diode pair 40 and 52 and at their other ends to the other pairs of diodes 42–54, 44–56, and 46–58. For example, the other end of coil 32 may be attached or connected to the second diode pair 42 and 54, and coil 34 may be connected at its other end to diode pair 44 and 56 and coil or winding 36 may have its other end connected to diode pair 46 and 58. A capacitor 60 is placed between the positive and negative terminals to provide noise suppression. While a three-phase rectifier bridge has been described, the present invention contemplates rectifier bridges for alternators having more than three-phases. For example, FIG. 1 depicts an alternator having six phases. Thus, a rectifier bridge circuit for converting AC current to DC current would be incorporated with the alternator of FIG. 1 to rectify the AC current in the six phases.

With reference again to FIG. 1, in an embodiment of the present invention, an alternator housing end plate 100 is provided for affixing either the positive or the negative diodes to the alternator housing. Further, a secondary housing end plate 102 is provided for affixing the other of the negative or positive diodes. In order to reduce cost and manufacturing complexity, end plate 100 is adapted to axially align a first set of diodes and secondary end plate 102 is adapted to radially align a second set of diodes.

In one embodiment, the first set of diodes are a negative biased diodes and the second set of diodes are positive biased diodes. Plates 100 and 102 should be configured such that the diodes (positive or negative) that affixed to end plate 100 are positioned such that each of the diode leads are in close proximity to each of the leads of one of the axially oriented diodes. One set of start and end leads from each of the stator windings should also be routed in close proximity to each of the pairs of diode leads. The positive diode lead, the negative diode lead and the one set of stator winding leads are connected together by a mechanical means such as plasma welding, resistance welding, crimping, ultrasonic welding or soldering. This attachment scheme is repeated for each phase of the stator assembly. As such, the need for a separate circuit board, as provided and disclosed by prior art alternator designs, can be eliminated. Further, the number of electrical connections is greatly reduced. However, if the stator winding leads cannot be routed near the diode connections within the stator assembly, then a circuit board can be used to create the electrical interconnection.

With continuing reference to FIG. 1, housing end plate 100 and secondary end plate 102 are illustrated, in accordance with the present invention. Housing end plate 100 includes a plurality of mounting apertures 150 for securing end plate 100 to the alternator housing 12. End plate 100 further includes a plurality of recesses 152 for securing diodes to end plate 100. The diodes may have an interference fit with recesses 152 and/or solder may be applied to secure the diodes in the recesses to provide an electrical and thermal connection between the diodes and end plate 100. Further, end plate 100 may include apertures, vent holes, and fins to allow air to circulate through the alternator assembly facilitating heat dissipation.

Secondary end plate 102 is coplanar with housing end plate 100 and is secured to housing end plate 100 through mechanical means, such as bolts or screws through apertures 200. An opening 202 is provided in secondary end plate 102 to allow the shaft of the rotor or armature (not shown) to extend therethrough. Further, a plurality of bores 204 are provided in a side 206 of secondary end plate 102. Bores 204 are configured to receive diodes, such that the diodes are disposed radially, allowing the diode leads to extend towards each of the plurality of diodes axially aligned in end plate 100. Secondary end plate 102 further includes a plurality of heat dissipating fins 208 for radiating heat generated by the operation of the diodes.

In addition, a separate plate (not shown) mounted to end plate 100 may be used to mount the diodes in an axial direction rather than mounting the diodes directly to end plate 100. The present invention contemplates other configurations and adaptations of housing end plate 100 and secondary end plate 102. For example, secondary end plate 102 may be integrally formed with housing end plate 100. Further, in other embodiments of the present invention, housing end plate 100 is configured to radially align the diode while secondary end plate 102 is configured to axially align the diodes. However, in any of the embodiments of the present invention, the diode leads are joined with stator winding end leads 210, 212 to form an electrical interconnection 214. The connection to stator winding end leads 210, 212 can also be made with a circuit board.

Figure 3:
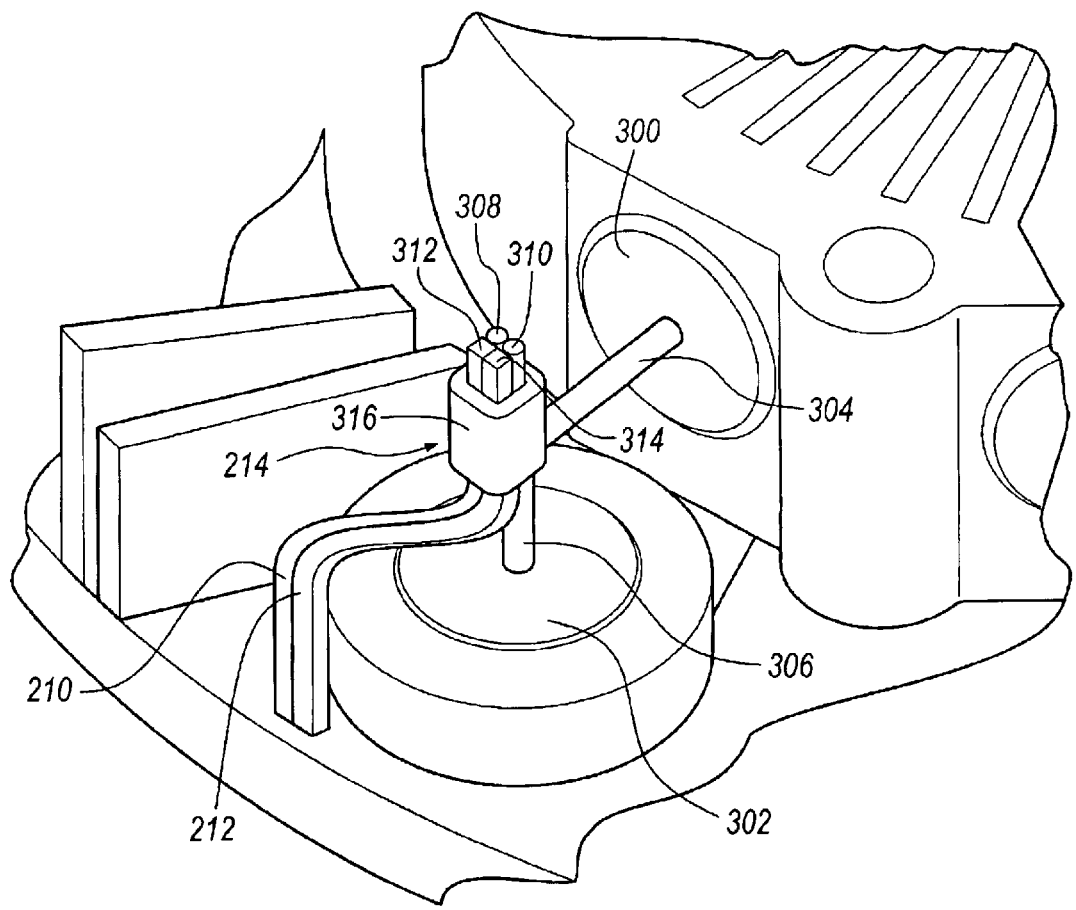
FIG. 3 illustrates an electrical interconnection of the positive and negative diodes, in accordance with an embodiment of the present invention.

Referring now to FIG. 3, a magnified view of the interconnection of a radially aligned diode 300 and an axially aligned diode 302 is illustrated, in accordance with the present invention. Radially aligned diode 300 has a radially extending diode lead 304 and axially aligned diode 302 has an axially extending diode lead 306. As mentioned previously, radially aligned diode 300 may be a positive lead biased diode or negatively biased diode. If diode 300 is positively biased, than diode 302 is negatively biased and vice versa. In order to form interconnect 214 an end portion 308 of radially extending diode lead 304 is bent to align axially with an end portion 310 of axially extending diode lead 306. Stator end leads 210, 212 are bent to axially align end portions 312 and 314 of stator winding end leads with diode lead end portions 308 and 310. Interconnection 214 of diode leads 304, 306 and stator winding end leads 210 and 212 may be formed by plasma welding, resistance welding, ultrasonic welding, and/or soldering. Other methods contemplated by the present invention include mechanical fastening such as crimping using a cylindrically extending sleeve 316. However, other mechanical and electrical interconnections may be used.

The present invention has many advantages and benefits over the prior art. For example, in an embodiment of the present invention a housing end plate is provided for orienting one of a positive and negative diode in an axially direction while a secondary end plate is provided to orient the other of a positive and negative diode in a radial direction. This means of radial and axial alignment of the positive and negative diodes allows electrical interconnection of the positive and negative diodes to each other as well as with the stator end leads of a stator winding. The electrical interconnection of the positive and negative diodes and the stator end leads eliminates the need for a separate circuit board to electrically interconnect the same. Thus, the embodiments of the present invention greatly reduce cost and complexity of an alternator assembly embodying these aspects of the present invention.

As any person skilled in the art of alternator rectifiers and the electrical connection of the alternator's rectifier bridge circuit will recognize from the previous detailed description and from the figures and claims, modifications and changes can be made to the preferred embodiments of the invention without departing from the scope of this invention defined in the following claims.

We claim:

1. An alternator comprising:

a plurality of positive diodes, each positive diode having an anode electrode and a cathode electrode;

a plurality of negative diodes, each negative diode having an anode electrode and a cathode electrode;

a plurality of stator windings disposed about a central axis of the alternator each of the plurality of stator windings has a first end and a second end;

a first mount for fixing one of the plurality of positive diodes and the plurality of negative diodes in an axial orientation relative to the central axis; and a second mount for fixing the other of the plurality of negative diodes and the plurality of positive diodes in a radial orientation relative to the central axis, and wherein each of the anodes of the plurality of positive diodes is connected to each of the cathodes of the plurality of negative diodes and to at least one end of each of the plurality of stator windings to form a rectifier bridge circuit.

2. The alternator of claim 1 wherein the plurality of stator windings further comprise three stator windings.

3. The alternator of claim 1 wherein the first mount is planar.

4. The alternator of claim 1 wherein the second mount is cylindrical.

5. The alternator of claim 1 wherein the first mount fixes the plurality of positive diodes in the axial orientation.

6. The alternator of claim 5 wherein the second mount fixes the plurality of negative diodes in the radial orientation.

7. The alternator of claim 1 wherein the first mount fixes the plurality of negative diodes in the axial orientation.

8. The alternator of claim 7 wherein the second mount fixes the plurality of positive diodes in the radial orientation.

9. An alternator having a rotor axis, the alternator comprising:

a plurality of positive diodes, each positive diode having an anode electrode and a cathode electrode;

a plurality of negative diodes, each negative diode having an anode electrode and a cathode electrode;

a plurality of stator windings each of the plurality of stator windings has a first end and a second end;

a first diode plate for fixing one of the plurality of positive diodes and the plurality of negative diodes in an axial orientation with respect to the rotor axis; and a second diode plate for fixing the other of the plurality of negative diodes and the plurality of positive diodes in a radial orientation with respect to the rotor axis, and wherein each of the anodes of the positive diodes are connected to each of the cathodes of the negative diodes and to at least one end of each of the plurality of stator windings to form a rectifier bridge circuit.

10. The alternator of claim 9 wherein the plurality of stator windings further comprise six stator windings.

11. The alternator of claim 9, wherein the first diode plate is planar.

12. The alternator of claim 11 wherein the second diode plate is cylindrical.

13. The alternator of claim 9 wherein the first diode plate fixes the plurality of positive diodes in the axial orientation.

14. The alternator of claim 13 wherein the second diode plate fixes the plurality of negative diodes in the radial orientation.

15. The alternator of claim 9 wherein the first diode plate fixes the plurality of negative diodes in the axial orientation.

16. The alternator of claim 15 wherein the second diode plate fixes the plurality of positive diodes in the radial orientation.

* * * * *